INVENTORS
John J. Ritter
BY John H. Ritter

Fred C. Matheny
ATTORNEY

Patented Nov. 18, 1947

2,431,080

UNITED STATES PATENT OFFICE 2,431,080

METHOD AND APPARATUS FOR COMBINING ALTERNATING- AND DIRECT-CURRENT VOLTAGES

John Joseph Ritter and John H. Ritter, Seattle, Wash.; said John H. Ritter assignor to John Joseph Ritter Application December 4, 1943, Serial No. 512,950

6 Claims. (Cl. 315—170)

1

This invention relates to means for and a method of combining a source of A. C. with a secondary D. C. source so that a combined heating effect and electro-chemical decomposing process can be applied to facilitate the welding together of metals by destroying intervening films.

This invention is herein described as applied to welding but it will be understood that the combined A. C. and D. C. provided in accordance with this invention may be advantageously used for the purpose of subjecting many different substances to processes of combined heating and electrolysis to thereby bring about changes in the substances, such as reduction, extraction, catalytic action, plating and the like.

This invention also relates to a polarizing differential A. C. generator or quasi D. C. converter and to a mixer of A. C. and D. C. current and the devices herein disclosed are arranged to serve as a low impedance to both A. C. and D. C.

This invention may also be described as a combination of an A. C. transformer connected in series with secondary polarizing cells, suitable current being supplied to each respective element and both currents flowing through a common channel to the load.

Either A. C. or D. C. can be used for welding purposes but A. C. alone does not work satisfactorily as the welding arc produced thereby flutters when grease, dirt, salts, paint or oxide films are present. Also the reversals in the direction of flow of current in an A. C. arc may cause the arc to flutter. In accordance with our method A. C. is used as the principal current but enough D. C. is fed through the arc to break down the films and to stabilize the arc by providing a flow of D. C. in the arc between the pulses of A. C. An amount of D. C. varying from one to twenty percent is sufficient for most work, depending on the thickness and nature of the films. This variable amount of D. C. may be obtained by the use in the circuit of a variable or adjustable transformer.

This invention preferably employs electro-chemical converter means in the nature of polarized cell groups of a form more fully described in our prior Patent No. 1,810,295, issued June 16, 1931.

In the accompanying drawings:

Fig. 3 is a view partly in section and partly in

2 elevation of a polarizing cell unit constructed in accordance with this invention.

Figures 3, 4:
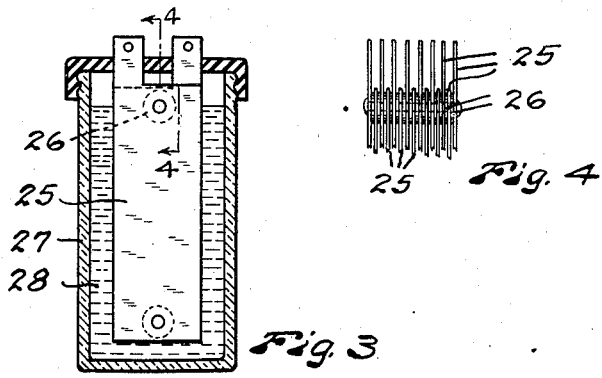

Fig. 4 is a fragmentary sectional view of said cell unit taken substantially on broken line 4—4 of Fig. 3.

Like reference numerals designate like parts throughout the several views.

Figure 1:
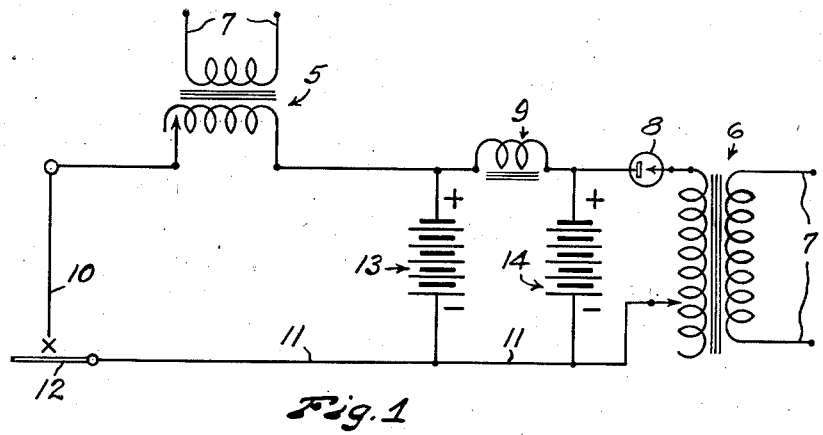
Fig. 1 is a diagrammatic view showing a form of our invention that uses groups of polarizing cells.

The welding apparatus shown in Fig. 1 comprises two transformers 5 and 6 each connected with conductors 7 through which A. C., such as 110 volt A. C. is supplied to the primary coils of said transformers.

One terminal of the secondary coil of the transformer 6 is connected in series with a rectifier 8, a choke coil 9, the secondary coil of the transformer 5 and a welding rod 10. The other terminal of the secondary coil of the transformer 5 is connected by a conductor 11 with an article 12 that is to be welded. Obviously parts 10 and 12 are interchangeable, i. e. part 12 may be a welding rod and part 10 may be an article to be welded.

Preferably two groups of polarizing cells 13 and 14 made up in battery form are connected across the conductors that go to make up the two sides of the circuit above described. One terminal of the polarizing cell group 13 is connected in this circuit between the transformer 5 and the choke coil 9. The other terminal of the cell group 13 is connected with the conductor 11. Similarly one terminal of the cell group 14 is connected with the circuit between the choke coil 9 and the rectifier 8 and the other terminal of said cell group 14 is connected with conductor 11. The circuit that is formed by elements 10, 13, 11, 5 and 12 is a combined A. C. and D. C. circuit. The circuit that is formed by elements 6, 8, 9, 13 and 11 is a D. C. circuit. The combined A. C. and D. C. circuit 10, 5, 13, 11, 12 carries a relatively large amount of current. The D. C. circuit 6, 8, 9, 13, 11 carries a much smaller amount of current. The polarizing cell group 13 functions as a by-pass element which segregates the two above mentioned circuits and provides a path for A. C. to reach the welding arc without passing through the D. C. circuit. The value of the D. C. current may be varied by moving the adjustable terminal or tap of the transformer 6 and the value of the A. C. current may be similarly varied by moving or adjusting the adjustable tap or terminal of the transformer 5.

The polarizing cell groups 13 and 14, Fig. 1, are used in a differential capacity in that a difference in amount of A. C. current flowing in opposite directions sets up a polarization effect of A. C. and D. C. superimposed on each other, the A. C.

furnishing most of the heat required and the D. C. serving to bring about electrolysis, as in molten salts or fluxed welding, and helping to maintain the welding arc without fluttering.

Pure A. C. is not satisfactory for welding, due to fluttering of the arc, and for this reason it is now common practice to use one hundred percent D. C. for welding. The apparatus required for the production of a sufficient amount of pure D. C. for welding purposes is costly and cumbersome. In accordance with our method we use mostly A. C. but provide just enough D. C. to give the required polarization and cause the metals to coalesce. The small amount of D. C. accomplishes this purpose by breaking down and decomposing the films of foreign matter that tend to prevent coalescence and cause the arc to flutter. The polarizing cells 13 and 14 are preferably each formed of two sets of relatively thin, closely spaced apart, alternately positioned parallel plates 25, see Figs. 3 and 4. The plates 25 of each set are electrically connected together and adjacent plates of the different sets are spaced apart by insulating washers 26. The plates of each polarizing cell are disposed within a suitable container 27 and immersed in a solution 28. The plates 25 may be simple hard iron or nickel immersed in potassium, sodium and lithium hydroxide solutions or said plates may be hard, thin lead plates immersed in sulphuric acid solutions. The secondary voltage of polarization per cell may vary from zero to one and eight-tenths volts for alkaline types of cells and from zero to two and two-tenths volts for lead-acid types of cells.

The polarizing cells are designed so that physical changes or chemical changes in the electrode structure or composition will not occur. Also they are designed so that the opposing E. M. F. of polarization can attain an equilibrium with any applied potential within the limits of the surface tension of the solution, which is the critical voltage point where gases appear. The nature of the electrode element and electrolyte to a certain degree determines the maximum E. M. F. of polarization; and the highest efficiency of energy reciprocation is determined by the maximum E. M. F. of polarization per cell with the least internal resistance. This device therefore functions with the highest degree of efficiency for transitory, accumulative devices where storage is not essential.

Our polarizing cell is not similar to a storage battery; as in a storage battery there is diffusion through the plates which absorb and give up gases, and the hydrogen and oxygen leave the solution to react with the powders in the plates, whereas there is no diffusion in the plates of this polarizing cell as they do not absorb or give up gases and the hydrogen and oxygen therefore never leave the solution. The reaction of the gases in the nascent state with the plates of a storage battery make it possible for them to take a charge, hold a charge for a considerable time, and become overcharged or overdischarged, whereas our battery will not take a permanent charge. Storage batteries are therefore dependent on changes in the plates and solution, the plates often becoming very much distorted in use, whereas there is no change whatever in the formation of the plates or in the solution of this device.

The voltages, as determined by the resistance of the welding arc multiplied by the D. C. flowing through said arc govern the number of polarizing cells required in the cell groups 13 and 14. This voltage must be sufficient to accomplish electrolysis. The number of cells used in each group is therefore proportional to the voltage required at the welding arc or load to bring about the desired electro-chemical change and in a welding circuit this number may vary from one to eighteen cells. The normal working voltage of each polarizing cell unit is preferably about one and one half volts. Thus the voltage required at the arc divided by one and one half determines the number of cell units used in each cell group or battery. The number of plates or surface area of plates in each cell is proportional to the amperage required.

Figure 2:
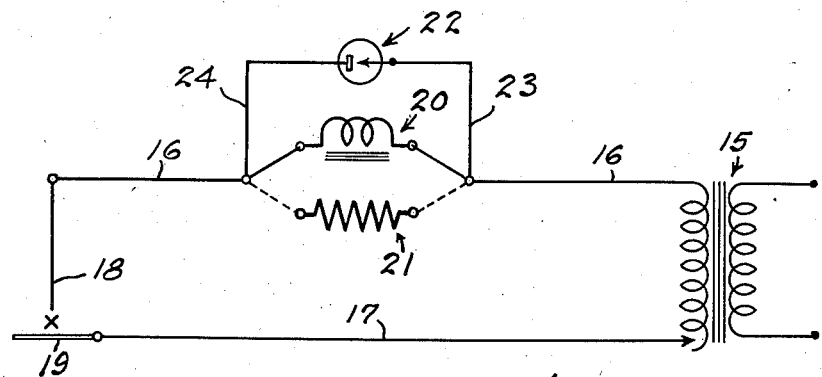
Fig. 2 is a diagrammatic view of a form of this invention in which the groups of polarizing cells are omitted.

In the welding apparatus shown in Fig. 2 the polarizing cells are all omitted and the secondary coil of the transformer 15 is connected by conductors 16 and 17 with a welding rod 18 and with an article 19 to be welded. A. C., such as 110 volt A. C., is supplied to the primary coil of the transformer 15. An impedance, which may be either a choke coil 20 or a resistance 21, or a combination of both, is interposed in the conductor 16 and a rectifier 22 is connected in parallel with said impedance by conductor means 23 and 24. The circuit shown in Fig. 2 supplies what we term unbalanced or differential A. C., which we find is superior to pure A. C. for welding purposes but is not as good as the quasi D. C. provided by the circuit having the polarizing cell groups as shown in Fig. 1.

We have also been able to obtain fairly satisfactory results by substituting an ordinary storage battery, of a voltage sufficient to bring about electrolysis at the welding arc, for the polarizing cell 14. The charge in this storage battery is preferably maintained by trickle charging. A storage battery, when thus used in place of polarizing cell group 14, will furnish a steady charge of D. C. to the polarizing cell group 13.

The foregoing description and accompanying drawings clearly disclose certain preferred embodiments of our invention but it will be understood that changes in the invention may be made within the scope and spirit of the following claims.

We claim:

1. In the welding of metals by alternating current electricity that is unbalanced by the introduction of direct current electricity thereinto, an alternating current source; a direct current source; welding means including an electrode and a work piece; circuit means connecting said welding means with said two current sources; and means for by-passing the alternating current around the direct current source and preventing the alternating current from passing through the direct current source comprising hydrogen-oxygen polarizing cells of non-storage type in said circuit.

2. In the welding of metals by alternating current electricity that is unbalanced by the application thereto of direct current electricity, a source of alternating current; a source of direct current; a welding circuit connected with said two sources of current; welding means comprising an electrode and a work piece connected in series in said welding circuit; a choke coil in series with said source of direct current adapted to retard the flow of alternating current through said source of direct current; hydrogen-oxygen polarizing cells of non-storage type shunting said choke coil and said source of direct current, said choke coil providing maximum impedance and said polarizing cells providing minimum impedance to the passage of alternating current thus compelling the alternating current to pass through the welding means without passing through the direct current source.

3. In the welding of metals by alternating current electricity that is unbalanced by the application thereto of direct current electricity, a source of alternating current; a source of direct current; welding circuit means connected with said two sources of current; welding means comprising an electrode and a work piece connected in series with said welding circuit; a choke coil in series with said source of direct current; and hydrogen-oxygen polarizing cells of non-storage type connected across said choke coil and said source of direct current for transmitting alternating current around said direct current source.

4. Devices for welding metals by the use of alternating current electricity comprising welding means including an electrode and a work piece; a source of alternating current of relatively high voltage sufficient for welding purposes; alternating current circuit means connecting said source of alternating current with said welding means; instantaneous direct current hydrogen-oxygen polarizing cells connected in series combination with said alternating current circuit; a source of supply of relatively low voltage direct current; and conductor means connecting said source of supply of direct current with said polarizing cells, whereby low voltage direct current from said source of supply of direct current will charge said polarizing cells until an equal back electromotive force is attained whence the current flow ceases and the direct current then flows through the load and alternating current source circuit to unbalance the alternating current used for welding and to provide at the welding arc an alternating current differential sufficient to insure polarization and effect electrochemical decomposition at said welding arc.

5. In the welding of metals by alternating current electricity, means for causing more electric current to flow in one direction through a welding arc than in the opposite direction to thereby polarize the arc, comprising a source of alternating current; two circuits in parallel with each other, said parallel circuits being connected in series with the welding arc and the alternating current source, one of said parallel circuits being constitutionally an alternating current conducting circuit of relatively low alternating current impedance capable of several volts direct current potential drop and the other parallel circuit having alternating current impedance devices therein and being limited to the conductance of unidirectional current; and means for energizing said unidirectional current circuit with direct current, whereby the potential of said direct current, in its duration, induced in the unidirectional conducting circuit is simultaneously counteracted by an equivalent back direct current potential in the alternating current conducting circuit thereby preventing the direct current from passing through the alternating current circuit and causing the direct current to pass through the arc and the alternating current source, thereby augmenting the current flow through the arc in one direction.

6. In a circuit wherein alternating and direct currents flow in series connection, a direct current source; an alternating current output means; and means for by-passing the alternating current around the direct current source comprising hydrogen-oxygen polarizing cells of non-storage type in said means.

JOHN JOSEPH RITTER.
JOHN H. RITTER.

REFERENCES CITED

The following references are of record in the file of this patent:

UNITED STATES PATENTS

| Number | Name | Date |
|---|---|---|
| 732,616 | Burgess et al. | June 30, 1903 |
| 2,139,160 | Hebeler | Dec. 6, 1938 |
| 2,173,450 | Larsen et al. | Sept. 19, 1939 |
| 1,570,803 | Walker | Jan. 26, 1926 |
| 926,128 | Moscicki | June 29, 1909 |
| 1,077,627 | Mershon et al. | Nov. 4, 1913 |
| 1,857,160 | McEachron | May 10, 1932 |
| 1,889,415 | Mershon | Nov. 29, 1932 |
| 2,008,496 | Garretson | July 16, 1935 |
| 2,273,996 | Ross | Feb. 24, 1942 |